Aug. 25, 1959 D. R. ELLIOTT ET AL 2,901,242
FLUID SPRING
Filed March 21, 1955 4 Sheets-Sheet 1

INVENTOR.
DANIEL R. ELLIOT
EUGENE H. CULP
WILLIAM H. HULSWIT, JR.
BY Irwin M. Lewis
ATTORNEY.

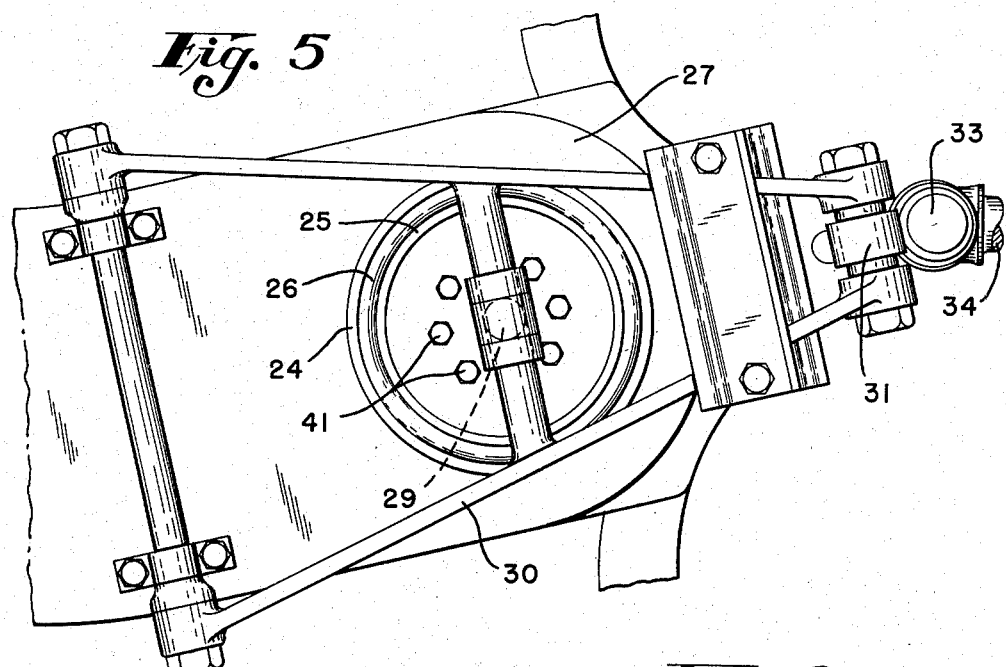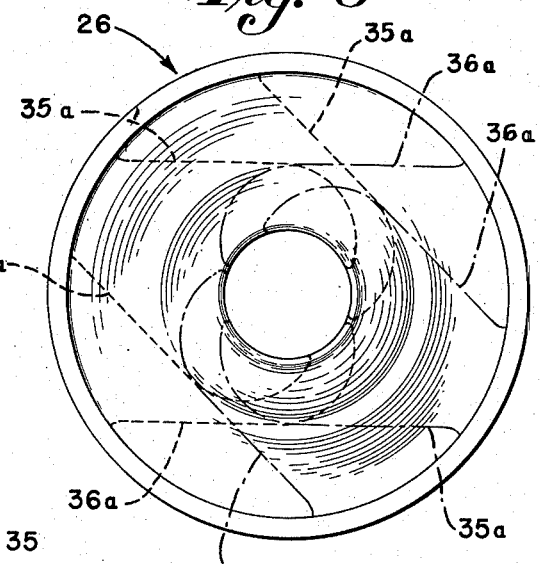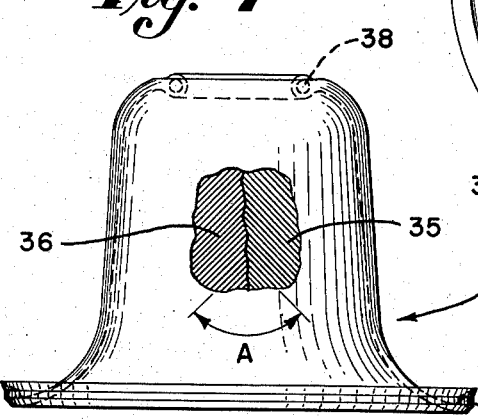

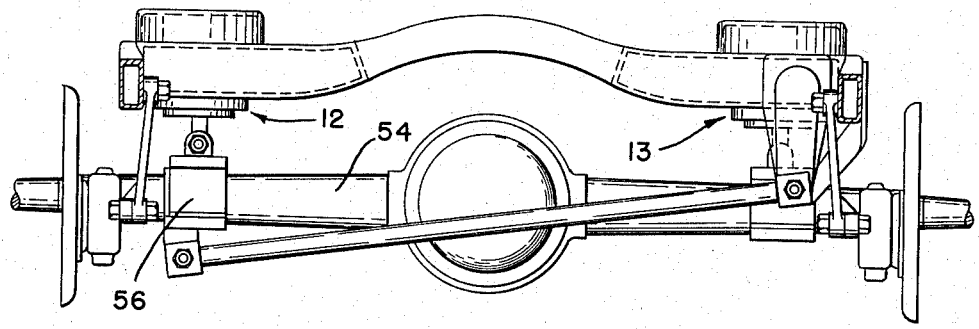
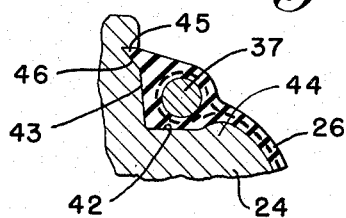
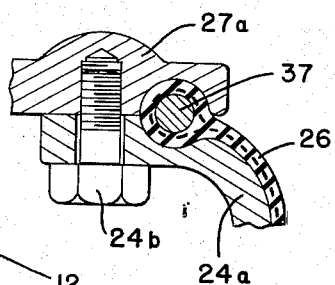
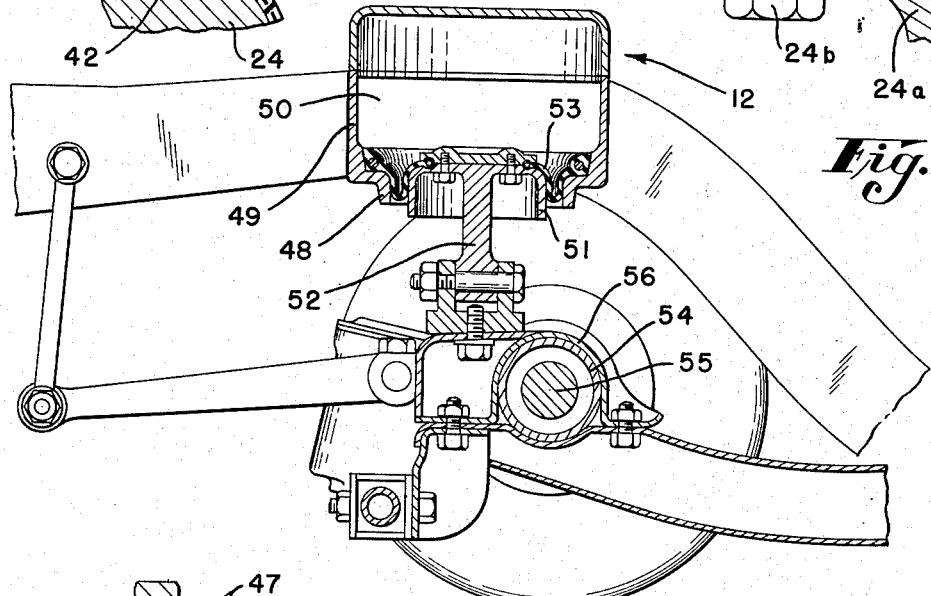
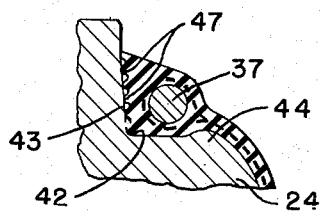

United States Patent Office 2,901,242
Patented Aug. 25, 1959

2,901,242

FLUID SPRING

Daniel R. Elliott, Grosse Pointe Woods, Eugene H. Culp, Detroit, and William H. Hulswit, Jr., Grosse Pointe Farms, Mich., assignors to United States Rubber Company, New York, N.Y., a corporation of New Jersey Application March 21, 1955, Serial No. 495,534

7 Claims. (Cl. 267—15)

Our invention relates to a fluid spring and more particularly to a fluid spring of the controlled area type incorporating a cylinder and piston and a flexible diaphragm interconnecting the piston and cylinder.

In a spring of this type, the diaphragm in a full stroke of the piston is turned completely inside out and accordingly may be pinched and damaged between the piston and cylinder unless some restraint is provided to prevent excessive relative lateral movement between piston and cylinder.

It has heretofore been proposed to incorporate some type of separate auxiliary guiding or aligning device to provide such restraint against relative lateral movement between piston and cylinder. We have, however, found that the diaphragm itself can be so constructed as to provide sufficient restraint against relative lateral movement between the piston and cylinder to prevent pinching and damaging of the diaphragm without the necessity of a separate auxiliary guiding or aligning device.

The principal object of the present invention is, therefore, to provide such a diaphgram. It is also an object of the invention to provide a novel mode of connection between the diaphragm and the piston and the cylinder which will provide effective sealing between the diaphragm, piston and cylinder and at the same time will facilitate the assembling of the diaphragm with the cylinder and piston.

The spring of the invention is shown and described hereafter in connection with the use thereof as a replacement for the usual metal leaf or coil type suspension spring for automobiles for the reason that such use best illustrates the function, utility and advantages of the spring. It will be apparent, however, that the spring of the invention has utility in other environments.

Referring to the drawings:

Fig. 5 is a bottom view of the front wheel suspension system shown in Figs. 2, 3 and 4;

Fig. 6 is a plan view of the disassembled diaphragm of the spring of the invention showing in dash and broken lines a few of the cords of the fabric thereof to illustrate the direction they extend as incorporated in the diaphragm;

Fig. 7 is an elevational view of the disassembled diaphragm of the spring of the invention, with surface portions thereof broken away to further show the disposition of the cords of the fabric in the diaphgram;

Fig. 8 is a rear view of the automobile chassis of Fig. 1 illustrating the incorporation of the spring of the invention in the rear wheel suspension system;

Fig. 9 is an enlarged sectional view of a rear wheel suspension system;

Fig. 10 is an enlarged sectional view showing a modification of the connection between the diaphragm and the cylinder portion of the air spring of the invention;

Fig. 11 is an enlarged sectional view showing a still further modification of the connection between the diaphragm and the cylinder portion of the air spring of the invention;

Fig. 12 is an enlarged sectional view showing another modification of the connection between the diaphragm and the cylinder of the spring of the invention; and Fig. 13 is a section view showing a modification of the connection between the diaphragm and the piston of the spring of the invention.

Figure 1:
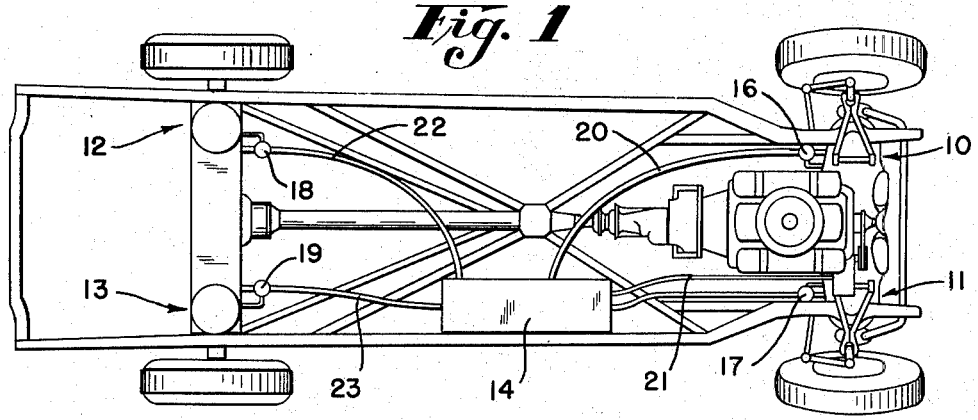
Fig. 1 is a plan view of the chassis of an automobile illustrating the locations of the springs of the present invention as utilized to replace conventional leaf or coil type suspension springs.

Referring to the drawings and in particular to Fig. 1 of the drawings, the fluid spring of the invention is illustrated as used to replace the conventional coil or leaf type suspension springs in an automobile. Four such springs, generally designated by the reference numerals 10, 11, 12 and 13 are provided, one for each wheel. Fluid (either a gas, or a vapor) under pressure is supplied to each spring from a fluid supply tank 14. The pressure in each spring is automatically controlled by separate regulator valves 16, 17, 18 and 19 interposed in conduits 20, 21, 22 and 23 interconnecting the supply tank 14 and the individual springs. The regulator valves serve to maintain sufficient fluid pressure in each individual fluid chamber so that the average deflection of each wheel suspension with respect to the automobile chassis is maintained at a predetermined amount, independent of the load or load distribution.

Figure 2:
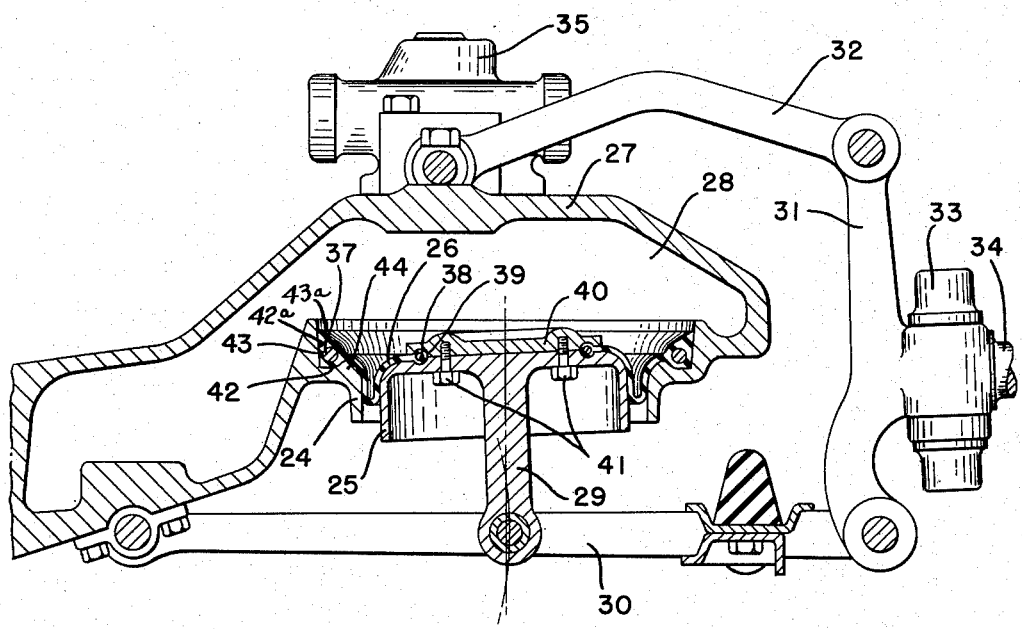
Fig. 2 is an enlarged sectional view illustrating the incorporation of the spring of the present invention in the front wheel suspension system of the automobile of Fig. 1 and showing the suspension system in a medial or normal position.

Whether the fluid spring is incorporated in the front wheel suspension or the rear wheel suspension, the essential structure thereof is the same and includes, as illustrated in Fig. 2 which shows the incorporation thereof in the front wheel suspension, a casing comprising a cylinder portion 24, a plunger or piston 25 of substantially smaller diameter movable through the cylinder portion, and a highly flexible, relatively thin, fluid impermeable diaphragm 26 interconnecting the cylinder portion 24 and the plunger or piston 25 thereby providing a fluid tight seal therebetween. The casing or cylinder portion 24 may be made as an integral part of the cross frame member 27 of the automobile chassis and a fluid chamber 28 for the spring may be also formed as an integral part of the cross frame member 27. The term "cylinder" is used herein in its mechanical or functional sense to define a member having a chamber in which a plunger or piston may operate and is not used in its geometrical or strict technical sense. The cylinder may in fact be of some other shape than cylindrical, e.g. elliptical, oval, or any other closed curve. The term "piston" is used herein to define a piston-like member or plunger adapted to reciprocate in radially spaced relation through and beyond the cylinder portion or cylinder in the extreme positions of the spring, and is not used in its strict technical sense.

The piston 25 has an integral rod 29 extending therefrom. The free end of the rod 29 is pivotally connected to the lower control arm 30 of the wheel suspension. The lower control arm 30 is pivotally connected at one end to the cross frame member 27 and at the other end to a knuckle support member 31. An upper support arm 32 is connected at one end to a shock absorber 35 and is pivotally connected at the other end to the knuckle support member 31. The lower control arm 30 and the upper support arm 32, therefore, serve to support the knuckle support member 31. The knuckle support member 31 carries the steering knuckle 33 of which the front wheel spindle 34 is an integral part. The front wheel is journaled on the spindle 34.

Figure 3:
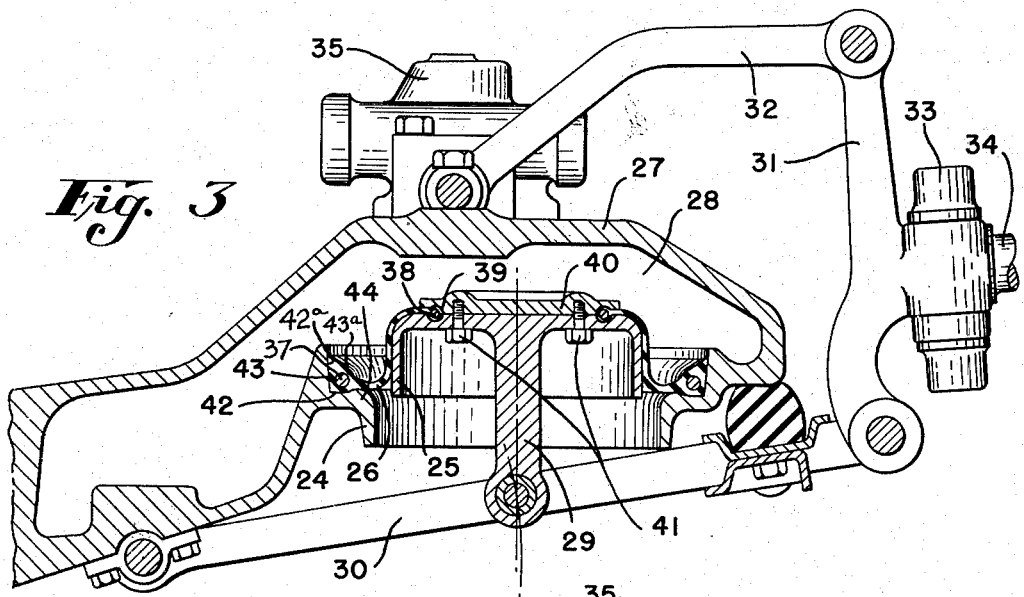
Fig. 3 is an enlarged sectional view similar to that of Fig. 2, but showing the wheel suspension system in its maximum upwardly deflected position.

This linkage arrangement, which is conventional, permits vertical up and down movement of the wheel. The upper extent of movement is illustrated in Fig. 3, the lower extent of movement in Fig. 4 and the normal or medial position in Fig. 2. Cushioning of this movement is provided by the fluid under pressure in the chamber 28 acting against the top surface of the piston 25 and the diaphragm 26.

Figure 4:
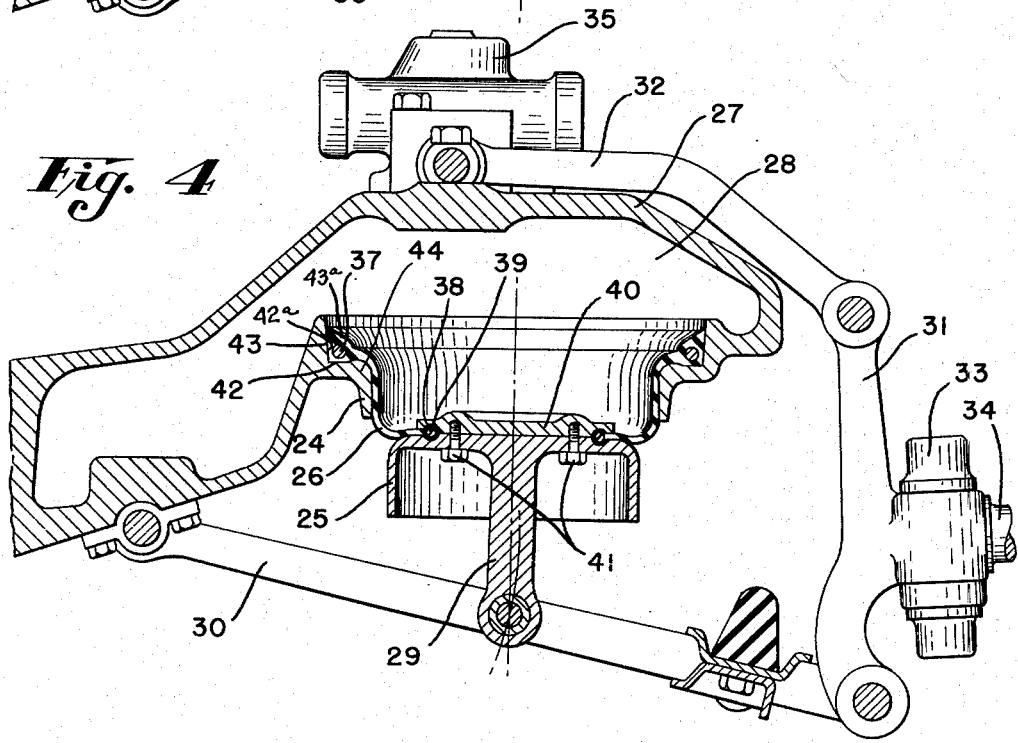
Fig. 4 is an enlarged sectional view similar to that of Fig. 2 but showing the wheel suspension system in its maximum downwardly deflected position.

The end of the rod 29 at the point it is connected to the lower control arm 30, moves, by reason of its connection to the arm 30 in an arcuate path in the movement of the piston 25 between its extreme positions as illustrated in Figs. 2, 3 and 4. The result of this movement of the end of the rod 29 along an arcuate path is that forces tending to move the piston 25 laterally against the wall of the cylinder are imposed on the piston 25 and unless some restraint is provided against lateral movement between the piston 25 and the wall of the cylinder portion 24 the piston 25 will move toward the wall of the cylinder 24 and pinch and damage the diaphragm 26.

We have found that the diaphragm itself can be so constructed as to provide sufficient restraint of the piston 25 against excessive lateral movement such as would pinch and damage the diaphragm. This construction of the diaphragm, which forms a principal part of the invention is shown in Figs. 6 and 7. Referring to Figs. 6 and 7, the diaphragm 26 is of a generally tubular or cup shape having a circumference at one end thereof larger than that at the other end so that the diaphragm may be readily turned inside out as shown in Figs. 3 and 4.

In the preferred form, the diaphragm 26 is formed of at least two plies, 35 and 36, of substantially inextensible weftless or weakened weft cord fabric of the type used in the manufacture of pneumatic tire casings. The diaphragm may also be formed of braided material. The individual cords of the cord fabric may be of nylon, cotton, rayon, steel, glass, or other relatively inextensible but flexible material. The cord fabric is coated, covered or otherwise provided with flexible, resilient rubber, either natural or synthetic, or other similar flexible, resilient plastic which will render the fabric fluid impermeable. The ends of the cord fabric are secured or anchored to annular, substantially inextensible and/or incompressible bead wire elements or bundles 37 and 38 similar to those used in the manufacture of pneumatic tire casings and the ends of the fabric are anchored to the bead wire bundles during vulcanization. The plies 35 and 36 are so laid that the individual cords 35a and 36a thereof extend from one end of the diaphragm to the other with the individual cords of one ply extending across the individual cords of other plies at an included angle, as indicated by the dimension A in Fig. 7, of between 30° and 150°. Expressed in terms commonly used in the tire and related fields, the cords of the individual plies are alternately laid in different directions at a cord angle between 15° and 75°, i.e., the angle between the individual cords and a plane perpendicular to the surface of the plies and through a line tangential to and in the plane of a circumferential line of said surface is between 15° and 75°.

This disposition of the individual cords of the plies of cord fabric provides a restraint against lateral movement of the piston 25 so that the piston may move between the extreme positions as illustrated in Figs. 3 and 4 without danger of the diaphragm 26 being pinched or damaged, as any movement of the piston laterally immediately imposes tension on a number of the cords whereby such lateral movement is restrained.

The diaphragm 26 may be fabricated in a manner analogous to the fabrication of a pneumatic tire. The bias cut plies of cord fabric, previously coated with rubber or other suitable material are wrapped around a form of the desired shape and spliced. The bead wire elements or bundles 37 and 38 are then applied and the ends of the plies are folded around the bead wire bundles and stitched down. Additional rubber is supplied for the bead portions or any other portions of the diaphragm by the application of additional strips of rubber in the region thereof during the fabrication. The assembly so formed is then placed in a mold of the desired final shape and vulcanized under heat and pressure.

The bead wire elements 37 and 38 and the layer of rubber surrounding the bead wire bundles facilitates fluid tight connection of the diaphragm to the piston 25 and to the cylinder 24. As can be best seen in Fig. 7, the bead portion of the diaphragm 26 adjacent the bead wire bundle 38 is inwardly turned and the bead portion of the diaphragm adjacent the bead wire bundle 37 is outwardly turned as shown in Fig. 2. The diaphragm is connected to the piston by clamping the bead portion of the diaphragm incorporating the bead wire 38 in an annular groove 39 formed half in the top of the piston 25 and half in a clamping plate 40 which is secured to the top of the piston by bolts 41. The groove is of slightly less cross sectional area than the bead portion of the diaphragm so that the resilient rubber surrounding the bead wire 38 is compressed to effect a tight seal.

As illustrated in Fig. 12, the diaphragm 26 may be secured to the cylinder in a somewhat similar manner. In this mode of connection, the cylinder 24a is made as a separate element which is secured to the cross frame member 27a by bolts 24b. The bead portion surrounding the bead wire bundle 37 is clamped in a groove formed in the face of the cylinder and the cross frame member thereby anchoring the diaphragm to the cylinder and effecting a fluid tight seal therebetween. We prefer, however, because of the ease of assembly to use the method of connection illustrated in Figs. 2, 10 and 11.

Referring to Fig. 2, and Fig. 10 the diameter of the cylinder 24 is increased near the upper end thereof to provide a generally planar shoulder portion 42. The annular wall 42a of this enlarged portion of the cylinder may be tapered toward the shoulder 42; however, the shoulder 42 generally extends at an angle of approximately 90° relative to the wall portion 42a. The bead portion surrounding the bead wire bundle 37 is molded to have an outer face 43 of an outer diameter slightly larger than the diameter of the enlarged portion of the cylinder, so that the face 43 of the bead portion of the diaphragm, is compressed when wedged into the enlarged portion of the cylinder and against the shoulder 42 to effect a fluid tight seal between the diaphragm and the cylinder. The face 43 of the bead portion terminates in a thin edge or lip portion 43a of rubber or the like which engages the wall portion 42a and is held in sealing engagement with said wall portion 42a by being compressed as pointed out above and by the pressure of the fluid within the spring. In this modification no clamping of the bead is necessary. The fluid pressure acting on the diaphragm serves to hold the bead portion on the shoulder 42 and against the wall portion 42a. The shoulder 42 may be undercut to provide a retaining flange 44 to further enhance the compression of the rubber to effect the seal, as well as to increase the anchoring of the diaphragm to the cylinder. Further sealing and anchoring may be provided by the provision of an integral lip 45 of resilient rubber, as shown in Fig. 10, which extends from the face 43 of the bead portion and is engaged in an annular groove 46 formed in the wall of the enlarged portion of the cylinder 24, or by the provision of the plurality of circumferentially extending, integral ribs 47 formed on the resilient rubber face 43 of the bead portion as shown in Fig. 11 which may be more easily compressed to effect the seal.

As illustrated in Fig. 13, a similar method to that for connecting the diaphragm 26 to the cylinder 24 may be used to connect the diaphragm 26 to the piston 25. This is accomplished by reducing the end of the piston 25 to provide a generally planar shoulder portion 25a and an annular wall portion 25b. The surface of this reduced portion of the piston may be tapered toward the shoulder 25a; however, the shoulder 25a generally extends at an angle of approximately 90° relative to the wall portion 25b. The bead portion surrounding the bead wire bundle 38 is molded to have an inner face 38b of a diameter slightly smaller than the reduced portion of the piston, so that the face 38b of the bead portion is compressed when placed around the annular wall portion 25b of the piston and pressed against the shoulder 25a. The face 38b of the bead portion terminates in a thin edge or lip portion 38c which also tightly engages and seals against the wall portion 25b. No clamping of the bead is necessary. The fluid pressure acting on the diaphragm serves to hold the bead against the shoulder and wall portion 25b to effect a fluid tight seal between the diaphragm 26 and the piston 25.

The sealing and anchoring of the diaphragm 26 to the piston 25 may be further enhanced by providing an integral lip or ribs (not shown) on the face 38a of the bead portion similar to the integral lip 45 and the ribs 47 provided on the face 43 of the bead portion surrounding the bead wire bundle 37 as previously described and illustrated in Figs. 10 and 11.

Figs. 8 and 9 illustrate the incorporation of fluid springs in the rear wheel suspension system. The structure and function of the fluid springs for the rear wheel suspension is essentially the same as that for the front wheel suspension and includes a cylinder portion 48 formed as an integral part of the cross frame member 49, a fluid chamber 50 also formed as part of the cross frame member 49, a piston 51 having an integral rod 52 and a diaphragm 53 interconnecting the piston 51 and the cylinder 48. The rod 52 of the piston 51 is connected to the axle housing 54 of the rear wheel axle 55 by means of a clamp 56. As shown in Fig. 8, a fluid spring is provided adjacent to each end of the axial housing and as the wheels are deflected upwardly or downwardly forces are imposed on the pistons of the fluid springs tending to move the piston laterally against the wall of the cylinder. The diaphragm 53, however, being of the structure as previously described, resists such lateral movement of the piston thereby preventing the diaphragm from being pinched and damaged.

From the above description, it can be seen that there is provided a novel fluid spring incorporating a flexible diaphragm so constructed as to restrain the piston against lateral movement and thereby prevent the diaphragm from becoming pinched and damaged. There is also provided novel modes of connection between the diaphragm and the cylinder and piston which facilitate the assembly of the diaphragm and the sealing thereof with the cylinder and piston.

While certain preferred forms of the spring have been shown and described, it is to be understood that this is for the purpose of illustration and that modifications and variations therein could be made without departing from the spirit and scope of the invention.

For example, while the diaphragm of the spring has been described as fabricated from two or more plies of cord fabric, it will be appreciated that a woven or braided fabric could be used and similar function obtained if the cords thereof are disposed at the angular relationship as described. Also, although the cylinder and piston have been shown as having parallel surfaces throughout part of their length so that the area acted upon by the fluid pressure is substantially constant throughout part of the stroke of the piston, it will be appreciated that the surfaces could be made non-parallel or of different shapes so that the area acted upon by the fluid pressure varies at various points in the stroke of the piston.

Having thus described our invention, what we claim and desire to protect by Letters Patent is:

1. In a fluid spring wheel suspension system of the type having a frame, a wheel supporting member mounted for movement relative to said frame, a cylinder carried by said frame, a plunger of smaller diameter than said cylinder pivotally secured to said wheel supporting member whereby said plunger is mounted for both lateral movement relative to said cylinder and reciprocating movement through and beyond said cylinder, and a generally tubular flexible diaphragm having a larger end connected to said cylinder and a smaller end connected to said plunger whereby the smaller end of said diaphragm may pass through and beyond said larger end in the extreme positions of the spring, the improvement comprising a diaphragm construction in which the body of the diaphragm has at least two plies of cord fabric formed of relatively inextensible cord elements coated with a fluid-impermeable composition, each of the cord elements of each ply extending from one end of said diaphragm to the other with the cord elements of one ply crossing those of the other ply at an included angle of between 30° and 150° and at a cord angle of between 15° and 75° whereby during operation of the spring the plunger is free to reciprocate through and beyond the cylinder but is restrained against lateral movement relative thereto by the disposition of the cord elements of the plies of the cord fabric.

2. In a fluid spring wheel suspension system of the type having a frame, a wheel supporting member mounted for movement relative to said frame, a cylinder carried by said frame with an annular wall portion of larger diameter adjacent one end thereof, a plunger of smaller diameter than said cylinder pivotally secured to said wheel supporting member whereby said plunger is mounted for both lateral movement relative to said cylinder and reciprocating movement through and beyond said cylinder, and a generally tubular flexible diaphragm having a larger end connected to said cylinder and a smaller end connected to said plunger whereby the smaller end of said diaphragm may pass through and beyond said larger end in the extreme positions of the spring, the improvement comprising a diaphragm construction in which the body of the diaphragm has at least two plies of cord fabric formed of relatively inextensible cord elements coated with a fluid-impermeable composition, each of the cord elements of each ply extending from one end of said diaphragm to the other with the cord elements of one ply crossing those of the other ply at an included angle of between 30° and 150° and at a cord angle of between 15° and 75° whereby during operation of the spring the plunger is free to reciprocate through and beyond the cylinder but is restrained against lateral movement relative thereto by the disposition of the cord elements of the plies of the cord fabric, and a substantially incompressible bead wire element to which the ends of the cord fabric at the larger end of the diaphragm are anchored to form a larger bead portion, the outer periphery of the larger bead portion having a facing of resilient compressible material the diameter of which, when the diaphragm is unassembled, is greater than the inner diameter of said annular wall portion, whereby when said bead portion is engaged with said wall portion said facing material will be compressed to form a fluid-tight self-sealing connection between the larger bead portion and said cylinder.

3. In a fluid spring wheel suspension system of the type having a frame, a wheel supporting member mounted for movement relative to said frame, a cylinder carried by said frame, a plunger of smaller diameter than said cylinder with an annular wall portion of smaller diameter adjacent one end thereof pivotally secured to said wheel supporting member whereby said plunger is mounted for both lateral movement relative to said cylinder and reciprocating movement through and beyond said cylinder, and a generally tubular flexible diaphragm having a larger end connected to said cylinder and a smaller end connected to said plunger whereby the smaller end of said diaphragm may pass through and beyond said larger end in the extreme positions of the spring, the improvement comprising a diaphragm construction in which the body of the diaphragm has at least two plies of cord fabric formed of relatively inextensible cord elements coated with a fluid-impermeable composition, each of the cord elements of each ply extending from one end of said diaphragm to the other with the cord elements of one ply crossing those of the other ply at an included angle of between 30° and 150° and at a cord angle of between 15° and 75° whereby during operation of the spring the plunger is free to reciprocate through and beyond the cylinder but is restrained against lateral movement relative thereto by the disposition of the cord elements of the plies of cord fabric, and a substantially incompressible bead wire element to which the ends of the cord fabric at the smaller end of the diaphragm are anchored to form a smaller bead portion, the inner periphery of the smaller bead portion having a facing of resilient compressible material the diameter of which, when the diaphragm is unassembled, is less than the outer diameter of said annular wall portion, whereby when said bead portion is engaged with said wall portion said facing material will be compressed to form a fluid-tight self-sealing connection between the smaller bead portion and said plunger.

4. In a fluid spring wheel suspension system of the type having a frame, a wheel supporting member mounted for movement relative to said frame, a cylinder carried by said frame with an annular wall portion of larger diameter adjacent one end thereof, a plunger of smaller diameter than said cylinder pivotally secured to said wheel supporting member whereby said plunger is mounted for both lateral movement relative to said cylinder and reciprocating movement through and beyond said cylinder, and a generally tubular flexible diaphragm having a large end connected to said cylinder and a smaller end connected to said plunger whereby the smaller end of said diaphragm may pass through and beyond said larger end in the extreme positions of the spring, the improvement comprising a diaphragm construction in which the body of the diaphragm has at least two plies of cord fabric formed of relatively inextensible cord elements coated with a fluid-impermeable composition, each of the cord elements of each ply extending from one end of said diaphragm to the other with the cord elements of one ply crossing those of the other ply at an included angle of between 30° and 150° and at a cord angle of between 15 and 75° whereby during operation of the spring the plunger is free to reciprocate through and beyond the cylinder but is restrained against lateral movement relative thereto by the disposition of the cord elements of the plies of the cord fabric, and a substantially incompressible bead wire element to which the ends of the cord fabric at the larger end of the diaphragm are anchored to form a larger bead portion, the outer periphery of the larger bead portion having a facing of resilient compressible material provided with a thin edge portion forming an annular lip the diameter of which, when the diaphragm is unassembled, is greater than the inner diameter of said annular wall portion, whereby when said bead portion is engaged with said wall portion said facing material and said annular lip will be compressed to form a fluid-tight self-sealing connection between the larger bead portion and said cylinder.

5. In a fluid spring wheel suspension system of the type having the frame, a wheel supporting member mounted for movement relative to said frame, a cylinder carried by said frame with an annular wall portion of larger diameter adjacent one end thereof, a plunger of smaller diameter than said cylinder pivotally secured to said wheel supporting member whereby said plunger is mounted for lateral movement relative to said cylinder and reciprocating movement through and beyond said cylinder, and a generally tubular flexible diaphragm having a larger end connected to said cylinder and a smaller end connected to said plunger whereby the smaller end of said diaphragm may pass through and beyond said larger end in the extreme positions of the spring, the improvement comprising a diaphragm construction in which the body of the diaphragm has at least two plies of cord fabric formed of relatively inextensible cord elements coated with a fluid-impermeable composition, each of the cord elements of each ply extending from one end of said diaphragm to the other with the cord elements of one ply crossing those of the other ply at an included angle between 30° and 150° and at a cord angle of between 15° and 75° whereby during operation of the spring the plunger is free to reciprocate through and beyond the cylinder but is restrained against lateral movement relative thereto by the disposition of the cord elements of the plies of the cord fabric, and a substantially incompressible bead wire element to which the ends of the cord fabric at the larger end of the diaphragm are anchored to form a larger bead portion, the outer periphery of the larger bead portion having a facing of resilient compressible material provided with a plurality of integral circumferentially extending ribs the diameter of which, when the diaphragm is unassembled, is greater than the inner diameter of said annular wall portion, whereby when said bead portion is engaged with said wall portion said ribs will be compressed to form a fluid-tight self-sealing connection between the larger bead portion and said cylinder.

6. In a fluid spring wheel suspension system of the type having a frame, a wheel supporting member mounted for movement relative to said frame, a cylinder carried by said frame with an annular wall portion of larger diameter adjacent one end thereof and a generally planar shoulder portion separating said wall portion and said cylinder, said shoulder portion extending at an angle of approximately 90° relative to said wall portion, a plunger of smaller diameter than said cylinder secured to said wheel supporting member whereby said plunger is mounted for reciprocating movement through and beyond said cylinder, and a generally tubular highly flexible relatively thin diaphragm having a larger end connected to said cylinder and a smaller end connected to said plunger whereby the smaller end of said diaphragm may pass through and beyond said larger end in the extreme positions of the spring so as to substantially turn the diaphragm inside out, the improvement comprising a diaphragm construction in which the body of the diaphragm has a substantially incompressible bead wire element at the larger end of the diaphragm to form a larger bead portion, the outer periphery of the larger bead portion having a facing of resilient compressible material the diameter of which, when the diaphragm is unassembled, is greater than the inner diameter of said annular wall portion, whereby when said bead portion is engaged with said wall portion and said shoulder portion said facing material will be compressed to form a fluid-tight self-sealing connection between the larger bead portion and said cylinder.

7. In a fluid spring wheel suspension system of the type having a frame, a wheel supporting member mounted for movement relative to said frame, a cylinder carried by said frame, a plunger of smaller diameter than said cylinder secured to said wheel supporting member whereby said plunger is mounted for reciprocating movement through and beyond said cylinder, said plunger having an annular wall portion of smaller diameter adjacent one end thereof and a generally planar shoulder portion separating said wall portion and said plunger, said shoulder portion extending at an angle of approximately 90° relative to said wall portion, and a generally tubular highly flexible relatively thin diaphragm having a larger end connected to said cylinder and a smaller end connected to said plunger whereby the smaller end of said diaphragm may pass through and beyond said larger end in the extreme positions of the spring so as to substantially turn the diaphragm inside out, the improvement comprising a diaphragm construction in which the body of the diaphragm has a substantially incompressible bead wire element at the smaller end of the diaphragm to form a smaller bead portion, the inner periphery of the smaller bead portion having a facing of resilient compressible material the diameter of which, when the diaphragm is unassembled, is less than the outer diameter of said annular wall portion, whereby when said bead portion is engaged with said wall portion and said shoulder portion said facing material will be compressed to form a fluid-tight self-sealing connection between the smaller bead portion and said plunger.

References Cited in the file of this patent

UNITED STATES PATENTS

| Number | Name | Date |
|---|---|---|
| 575,783 | Quimby | Jan. 26, 1897 |
| 1,537,112 | Glackin | May 12, 1925 |
| 1,572,095 | Van Der Pyl | Feb. 9, 1926 |
| 1,711,207 | Van Der Pyl | Apr. 30, 1929 |
| 2,023,135 | Hawkins | Dec. 3, 1935 |
| 2,056,106 | Kuhn | Sept. 29, 1936 |
| 2,231,359 | Day | Feb. 11, 1941 |
| 2,257,913 | Maranville | Oct. 7, 1941 |
| 2,578,730 | Nicholson et al. | Dec. 18, 1951 |
| 2,587,470 | Herzegh | Feb. 26, 1952 |
| 2,638,357 | Larison | May 12, 1953 |
| 2,731,064 | Powers | Jan. 17, 1956 |

FOREIGN PATENTS

| Number | Country | Date |
|---|---|---|
| 17,813 | Great Britain | 1914 |
| 707,078 | France | Apr. 13, 1931 |
| 400,616 | Great Britain | Oct. 24, 1933 |